(12) United States Patent
Stockert et al.

(10) Patent No.: US 11,310,104 B2
(45) Date of Patent: Apr. 19, 2022

(54) MANAGEMENT OF PERSISTENT NETWORK SLICES BY A DISTRIBUTED LEARNING SYSTEM IN A 5G OR OTHER NEXT GENERATION WIRELESS NETWORK

(71) Applicant: AT&T Intellectual Property I, L.P., Atlanta, GA (US)

(72) Inventors: Mark Stockert, San Antonio, TX (US); Eric Zavesky, Austin, TX (US); James Pratt, Round Rock, TX (US); Linda Baughman, Bloomfield Hills, MI (US); Pamela Stuckman, Kalkaska, MI (US); Michael Gonzales, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 48 days.

(21) Appl. No.: 16/700,055

(22) Filed: Dec. 2, 2019

(65) Prior Publication Data
US 2021/0168031 A1    Jun. 3, 2021

(51) Int. Cl.
*H04L 12/24*    (2006.01)
*H04L 41/0806*    (2022.01)
(Continued)

(52) U.S. Cl.
CPC .......... *H04L 41/0806* (2013.01); *G06N 3/02* (2013.01); *H04L 5/0035* (2013.01);
(Continued)

(58) Field of Classification Search
CPC . H04L 41/0806; H04L 5/0035; H04L 5/0042; H04L 9/0637; H04L 43/0876; H04L 2209/38; G06N 3/02; H04W 16/10
(Continued)

(56) References Cited

U.S. PATENT DOCUMENTS

2018/0242304 A1* 8/2018 Rong .................. H04W 72/048
2019/0123963 A1* 4/2019 Tang ..................... H04W 48/18
(Continued)

OTHER PUBLICATIONS

3GPP TS 28.531v15.1.0, Technical Specification Group Services and System Aspects; Management orchestration; provisioning, date Dec. 2018 pp. 1-64 (Year: 2018).*
(Continued)

*Primary Examiner* — Obaidul Huq
(74) *Attorney, Agent, or Firm* — Amin, Turocy & Watson, LLP

(57) ABSTRACT

The technologies described herein are generally directed to facilitating the allocation, scheduling, and management of network slice resources. According to an embodiment, a system can comprise a processor and a memory that can store executable instructions that, when executed by the processor, facilitate performance of operations. The operations can include selecting a resource configuration for a network slice based on characteristics of a user device and historical data related to the user device, resulting in a selected resource configuration. The operations can further include facilitating communicating resource configuration data representative of the selected resource configuration for the network slice to a network device for allocation to the user device connected to the network device. The operations can further include facilitating allocating resources to the network slice in accordance with the selected resource configuration.

20 Claims, 10 Drawing Sheets

(51) Int. Cl.
*H04L 5/00* (2006.01)
*H04L 43/0876* (2022.01)
*G06N 3/02* (2006.01)
*H04L 9/06* (2006.01)
*H04W 16/10* (2009.01)

(52) U.S. Cl.
CPC .......... *H04L 5/0042* (2013.01); *H04L 9/0637* (2013.01); *H04L 43/0876* (2013.01); *H04W 16/10* (2013.01); *H04L 2209/38* (2013.01)

(58) Field of Classification Search
USPC .......................................... 370/310, 328, 329
See application file for complete search history.

(56) References Cited

U.S. PATENT DOCUMENTS

| | | | |
|---|---|---|---|
| 2020/0008044 A1* | 1/2020 | Poornachandran | G01C 21/3461 |
| 2020/0029250 A1* | 1/2020 | Ibek | H04L 41/0893 |
| 2020/0205060 A1* | 6/2020 | Karimli | H04W 24/10 |
| 2020/0205176 A1* | 6/2020 | Yu | H04W 72/042 |

OTHER PUBLICATIONS

Ferrus, et al. "Management of Network Slicing in 5G Radio Access Networks: Functional Framework and Information Models." arXiv:1803.01142. https://arxiv.org/abs/1803.01142. 2018. 16 pages.

Kavanagh, et al. "What is Network Slicing?". https://5g.co.uk/guides/what-is-network-slicing/. Aug. 28, 2018. 10 pages.

"Scalable network opportunities." https://www.ericsson.com/en/digital-services/trending/economic-study-5g-network-slicing. Last Accessed Feb. 25, 2020. 4 pages.

Stockert, et al. "Application Management of Network Slices With Ledgers." U.S. Appl. No. 16/519,633, filed Jul. 23, 2019. 51 pages.

Bisarai, et al. "Recalibrating Resource Profiles for Network Slices in a 5G or Other Next Generation Wireless Network." U.S. Appl. No. 16/804,392, filed Feb. 28, 2020. 46 pages.

Mhapsekar, et al. "Modifying Capacity Assigned to Support a Network Slice Allocated to a User Device in a 5G or Other Next Generation Wireless Network." U.S. Appl. No. 16/804,472, filed Feb. 28, 2020. 45 pages.

* cited by examiner

MANAGEMENT OF PERSISTENT NETWORK SLICES BY A DISTRIBUTED LEARNING SYSTEM IN A 5G OR OTHER NEXT GENERATION WIRELESS NETWORK

TECHNICAL FIELD

The subject application is related to management of persistent network slices by a distributed learning system in a 5G or other next generation wireless communication system, and, for example, allocation of resources to devices in a wireless network.

BACKGROUND

Fifth generation (5G) wireless communications can facilitate the abstraction of network services into network slices managed by the provider of the network. Considering the broad variety of devices that rely upon wireless communication, there is the potential for millions or billions of 5G network slices to be allocated to different types of devices. Given the scale and complexity of network slice utilization, allocating, maintaining, and managing network slices can be difficult.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
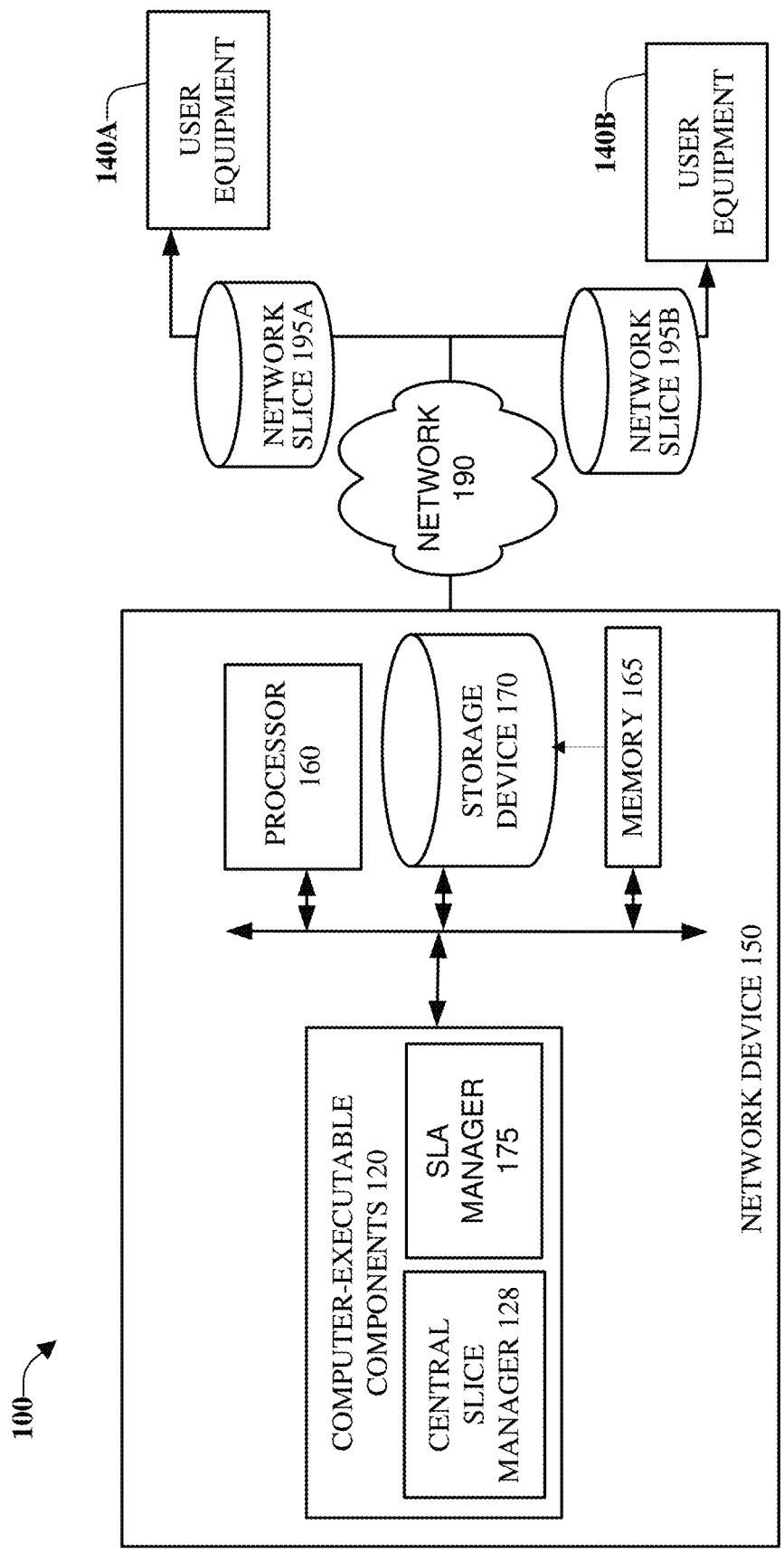
FIG. 1 is an architecture diagram of an example system that can facilitate the allocation and management of network slices for respective applications of UEs in accordance with one or more embodiments.

Generally speaking, one or more embodiments described herein can facilitate the allocation, scheduling, and management of network slice resources using different approaches. In addition, one or more embodiments described herein can be directed towards a multi-connectivity framework that supports the operation of New Radio (NR, sometimes referred to as 5G). As will be understood, one or more embodiments can allow an integration of UEs with network assistance, by supporting control and mobility functionality on cellular links (e.g. LTE or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments the non-limiting term user equipment (UE) is used. It can refer to any type of wireless device that can communicate with a radio network node in a cellular or mobile communication system. Examples of user equipment include, but are not limited to, a target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles, and other equipment that can provide similar functions. Example UEs are described further with FIGS. 9 and 10 below.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000, etc.

Generally speaking, in one or more embodiments, a network device can provide network slicing with elements to support different types of services and requirements. The network slicing can distribute functionality for facilitating services to devices across the network and can be used to support multiple virtual networks behind interfaces of the communication network. The slicing of the network into multiple virtual networks can provide support for different Radio Access Networks (RAN) and different service types running across a single RAN. Further, in one or more embodiments, flexible distribution of the access, edge, and core elements of the network cloud can provide optimal support regarding latency and/or service isolation for different apps and service requirements.

More specifically, as described herein, one or more embodiments can facilitate moving network slices across multiple access points, including the connection of a UE with an allocated slice to another UE for connectivity to an access point, e.g., this other UE being termed a local network UE for discussion. Example devices and contexts for this local network UE are discussed with FIG. 3 below. Once connected, one or more embodiments can use a local slice manager to directly manage a network slice allocated to the connecting UE. Management of sliced can be performed by one or more embodiments by incorporating the slice into a slice allocated to the local manager, e.g., incorporated as a subslice. Further, as discussed herein, records detailing resources allocated to slices and events associated with slices can be made available to the network via persistent storage, e.g., a blockchain ledger.

FIG. 1 is an architecture diagram of an example system 100 that can facilitate managing portable instances of network slices 195A-B for respective applications of UEs 140A-B, in accordance with one or more embodiments. System 100 can include network device 150 communicatively coupled to UEs 140A-B via network 190.

According to multiple embodiments, network device 150 can include memory 165 that can store one or more computer and/or machine readable, writable, and/or executable components 120 and/or instructions that, when executed by processor 160, can facilitate performance of operations defined by the executable component(s) and/or instruction (s). For example, memory 165 can store computer and/or machine readable, writable, and/or executable components 120 and/or instructions that, when executed by processor 160, can facilitate execution of the various functions described herein relating to network device 150, e.g., central slice manger 128.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

In one or more embodiments of network device 150, central slice manager 128 can allocate resources of network slices 195A-B to UEs 140A-B, respectively. To enable the allocations by network slices 195A-B depicted in FIG. 1, using different approaches described below, one or more embodiments of central slice manager can facilitate setting initial configurations of resources for network slices 195A-B.

Figure 2:
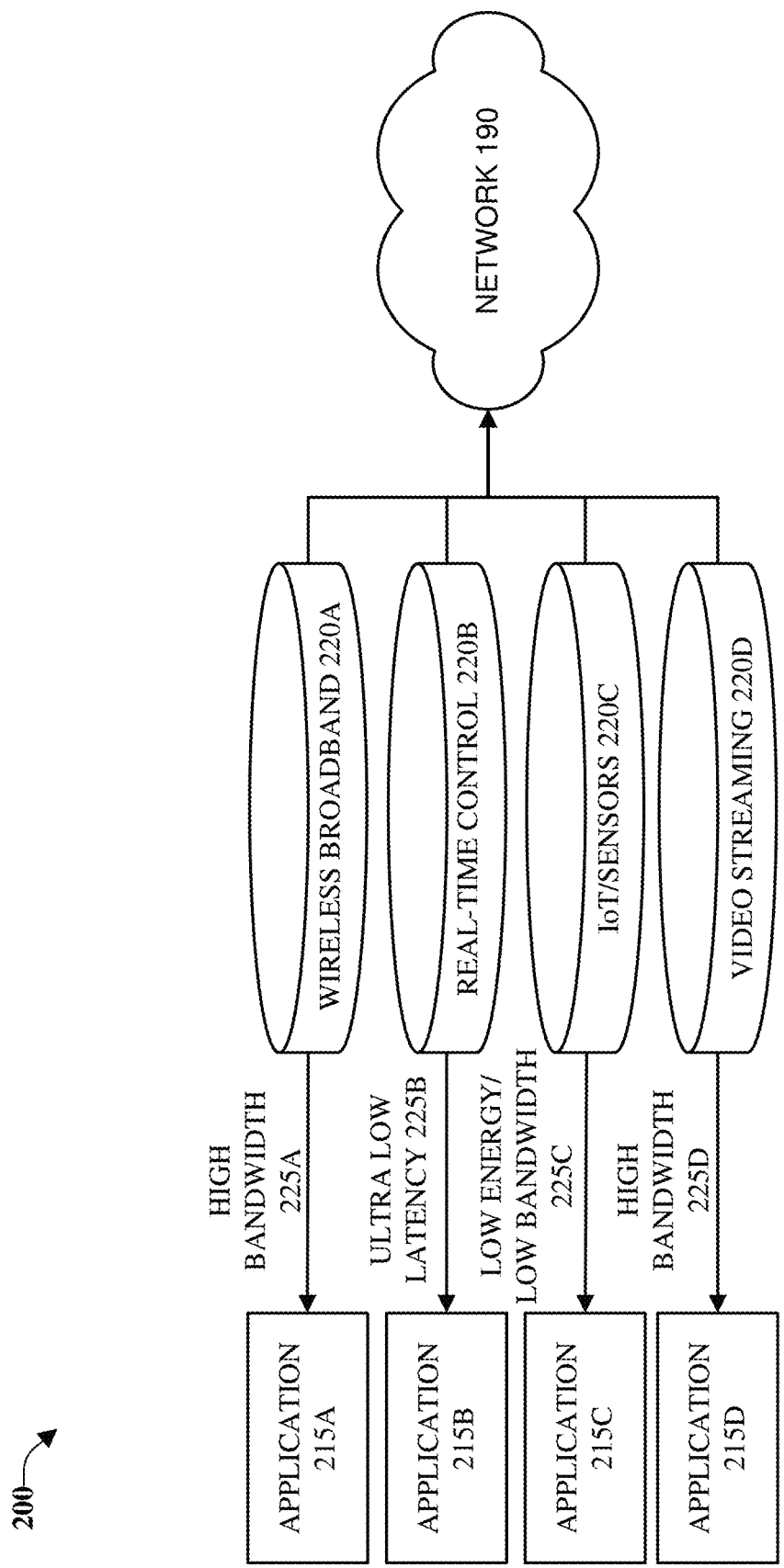
FIG. 2 illustrates an example system of network slices allocated to applications, in accordance with one or more embodiments.

FIG. 2 illustrates an example system 200 of network slices 220A-D allocated to applications 215A-D, in accordance with one or more embodiments. For purposes of brevity, description of like elements and/or processes employed in other embodiments is omitted.

In one or more embodiments, network slices can describe virtual networks with independent sets of logical network functions that can be selected to support particular requirements of different network applications. Applications, as a part of execution, can request allocation of a network slice having certain characteristics to facilitate successful program execution. Example characteristics of network slices can include, but are not limited to, location, speed, connectivity, latency, security, energy use, coverage, and capacity. Example, network slices 220A-D, configured with certain characteristics for certain applications, are discussed below.

In one or more embodiments, network slices can be optimized to provide the resources and network topology for the specific service and traffic required by applications 215A-D, these applications using resources of respective network slices. Different characteristics noted above, and throughout the present disclosure, can be allocated to meet the particular demands of each use case.

In an example, application 215A can require high-bandwidth 225A to facilitate wireless broadband network slice 220A. An example of application 215A can be a web browser that requires wireless broadband network slice 220A to deliver web content. In another example, application 215B can require ultra-low latency 225B to facilitate real-time control 220B. As discussed further in examples below, in an example, application 215B can utilize real-time control 220B to rapidly and dynamically control a flying drone. In another example, application 215C can utilize a low energy/low bandwidth 225C to facilitate efficient control of IoT sensors 220C. Specific approaches described further herein can also facilitate the developing 5G IoT to discover and adhere to slice-defined limitations. In another example, application 215D can require a high bandwidth 225D to facilitate video streaming 220D. One having skill in the relevant art(s), given the description herein, will appreciate that the above descriptions of applications that can utilize one or more embodiments is non-limiting, and other applications can be allocated combinations of resource characteristics to support different functions.

In one or more embodiments, network slices 220A-D can be virtually isolated from each other, and other network slices, e.g., no slice interferes with traffic in another slice. In some circumstances, this isolation can lower the risk of introducing and running new services, and can also support migration, because new technologies or architectures can be launched on isolated slices. This isolation can improve the security of the system, e.g., if a cyberattack breaches one slice the attack may be able to be contained and not be able to spread beyond that slice.

Figure 3:
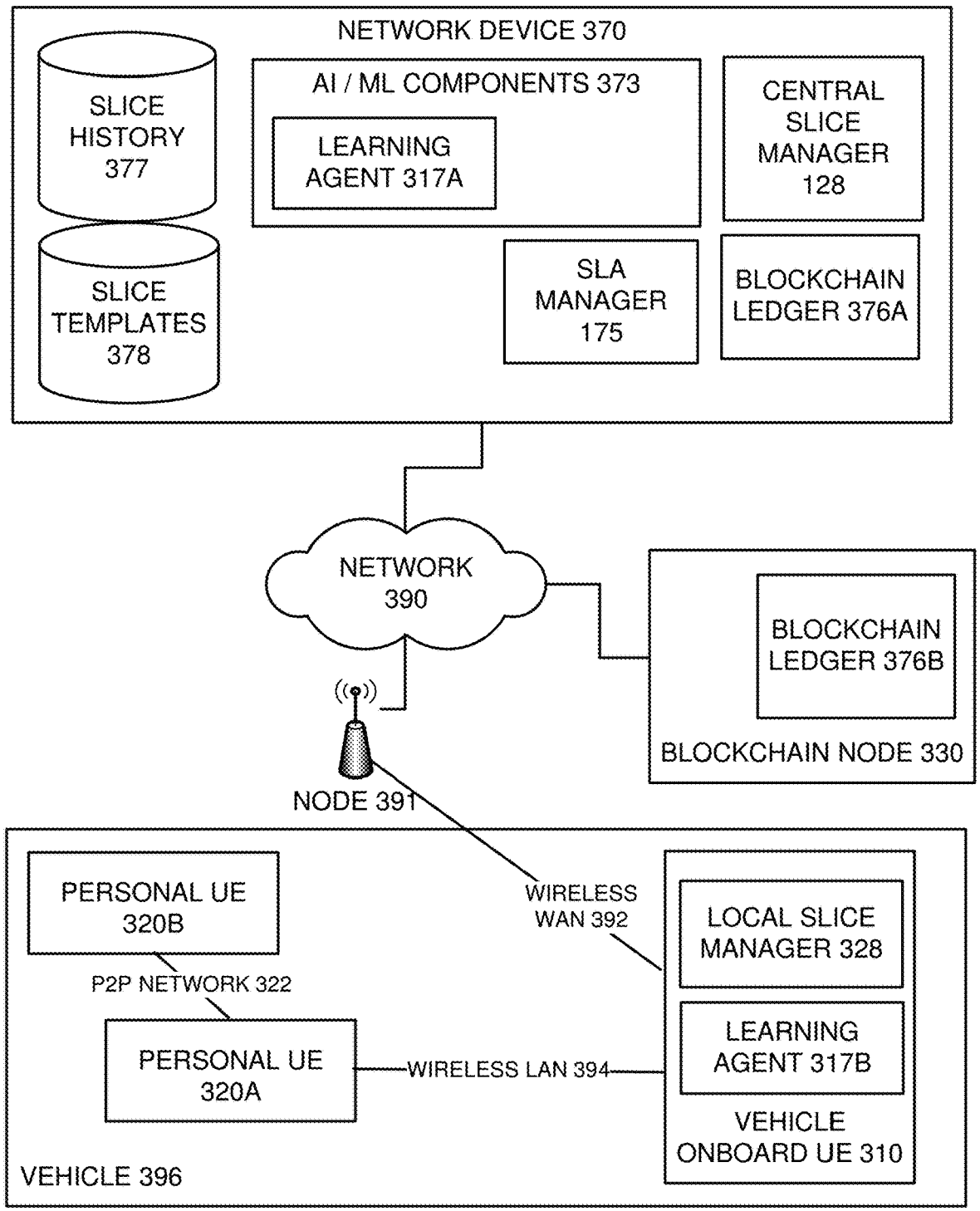
FIG. 3 illustrates a system that can use a network device to facilitate the allocation, scheduling, and management of network slice resources, in accordance with one or more embodiments.

FIG. 3 illustrates a system 300 that can use network device 370 to facilitate the allocation, scheduling, and management of network slice resources, in accordance with one or more embodiments. For purposes of brevity, description of like elements and/or processes employed in other embodiments is omitted.

When considering FIG. 3, it should be noted that, in some embodiments herein, a distinction is made between a personal UE and an onboard UE. As used herein, the former is generally a device for use by a single user to access a provider wireless network (e.g., a smartphone, tablet, or smartwatch), while the latter is, as described in FIG. 3, a base station that can receive wireless signals from the provider network and serve the connectivity to multiple devices in a wireless local area network (LAN), e.g., WiFi.

As depicted, system 300 can comprise a network device 370 communicatively coupled to vehicle 396 and blockchain node 330 via network node 390. Network device 370 can include slice history 377, slice templates 378, AI/ML components 373, central slice manager 128, service level agreement (SLA) manager 175, and blockchain ledger 376A. Blockchain node 330 comprises blockchain ledger 376B. AI/ML components include learning agent 317A. Vehicle 396 comprises vehicle onboard UE 310 communicatively coupled to personal UE 320A by wireless LAN 394. Personal UE 320A is coupled to personal UE 320B by peer to peer (P2P) network 322, and vehicle onboard UE 310 is communicatively coupled to node 390 via wireless wide area network (WAN) 392. Vehicle onboard UE 310 can include local slice manager 328 and learning agent 317B.

Network device 370 can facilitate the management of network slices by combining administration by central slice manager 128 with slice resources, e.g., in one or more embodiments, hardware and software configured to enable characteristics of slices similar to those discussed above with the description of FIG. 2 above. The functions of central slice manager 128 and local slice manager 328 of vehicle onboard UE 310 are described below.

In an example where personal UEs 320A-B are allocated individual slices (not shown), personal UEs 320A-B can initially be served wireless connectivity by a wireless WAN 392 connection to node 390. In one or more embodiments, changing contexts from independent connectivity to node 390, personal UE 320A can connect via wireless LAN connectivity to vehicle onboard UE 310. An example of this context switch, discussed with FIGS. 4-5 below, is a user with a handheld personal UE 320A boarding a bus, where vehicle onboard UE 310 is installed.

In an example implementation of vehicle onboard UE 310, vehicle onboard UE 310 can be a femtocell deployed in a public vehicle 396, e.g., a bus, a train, a ferry, and an airplane. This context could have one or more slices allocated that could incorporate subslices, e.g., context 410B having slice 415B with subslice 415A. These multiple layers of slice could be managed by a combination of resources local to the context (e.g., local slice manager 328 with the femtocell), and centralized management components, e.g., central slice manager. In one or more embodiments, having a wirelessly connected local network provide wireless connections to devices can enable fewer network resources to be used to provide service to devices, e.g., node 460 provides connectivity to a local network of context 410B, and this connectivity can be provided to devices 450A-B.

After establishing this connection, vehicle onboard UE 310 can use a local slice manager 328 to alter the characteristics of a slice based on different considerations, while a central slice manager 128 can also retain control over slice characteristics. Example considerations include, but are not limited to, changes to bandwidth based on a number of other devices also connected to vehicle onboard UE 310, e.g., to facilitate satisfactory connections by multiple devices. With respect to these alterations however, it is important to note that, in one or more embodiments, the changes can be personalized to particular devices, activities, users, times of day, etc.

One approach to personalization that can be utilized by one or more embodiments, includes the use of AI/ML components, such as AI/ML components 373 of network device 370 (e.g., learning agent 317A) and similar AI/ML components local to vehicle onboard UE 310, e.g., learning agent 317B. Slice customization features are generally discussed further below with FIGS. 4-5, and specific AI/ML details are discussed with FIG. 6.

In one or more embodiments personalized slices can be configured so as to be able to follow a user or device through different sensors and different parts of the network, these slices being termed by one or more embodiments a slice to go, or a portable slice. In one or more embodiments, activities of slices used within system 300 can be recorded and stored in slice history 377. This history can be used to rediscover slices when they reconnect to the network. For example, when personal UE 320A reconnects to vehicle onboard UE 310 at a later time, slice history 377 can be queried, and previous settings, activities, problems, and other characteristics can be used to configure a slice associated with personal UE 320A.

For purposes of implementing one or more embodiments, blockchain ledger entries can, in some circumstances, have advantages over using a database for different functions described herein. As described below, one main difference is that a blockchain is designed to be resistant to modification. Even given security restrictions, database values do not, as performed by blockchain ledgers 376A-B, maintain mandatory linkages to past and future entries. In one or more embodiments, as described further below, governing contracts can be stored in blockchain ledgers 376A-B with protective linkages to past and future entries, as well as other advantageous blockchain features described below.

As would be appreciated by one having skill in the relevant art(s), given the description herein, storing slice usage data in a blockchain can involve having a blockchain ledger (e.g., blockchain ledgers 376A-B) that contain blockchain ledger entries that correspond to usage data instances, e.g., the settings and event associated with slices as discussed herein. A new blockchain ledger entry can be based in part (e.g., chained to) previous ledger entries, with a solution to a complex mathematical problem being based on previous entries, and specific to the particular blockchain.

In some blockchain implementations used by one or more embodiments, before a new entry is added to a blockchain ledger, the entry can be validated by one or more other systems (e.g., a new entry can be generated by central slice manager 128 and validated by blockchain node 330). For example, in one or more embodiments, by utilizing network device 370, the network provider can create ledger entries and provide access to the entries for validation. In additional embodiments, blockchain ledger 376A (e.g., maintained by network device 370) can be copied and stored at external entities for auditing and other confidence building measures, e.g., vehicle onboard UE 310 can access blockchain node 330 both to receive slice usage data and audit blockchain ledger entries in blockchain ledger 376B. It should be appreciated that the provider blockchain ledger instance (e.g., blockchain ledger 376A) can be appended to, and maintained at different provider controlled locations, e.g., at eNB network devices, other network devices, the network core, and other usable storage locations. In one or more embodiments, this internal management of blockchain ledger 376A can provide an additional layer of security, while still allowing for distributed verification and management of ledger entries, e.g., blockchain ledger 376B available for slice identification by vehicle onboard UE 310 or other permitted entities. One set of blockchain features that can facilitate secure access by vehicle onboard UE 310 are features by blockchain that can provide location-based authentication/secure communications.

In an example of slice data that can be stored (e.g., in blockchain ledgers 376A-B) for reuse, 5G has a unique per slice identifier called the Single Network Slice Selection Assistance Information (S-NSSAI) identifier. In one or more embodiments, each packet data session between a UE and the 5G network has one and only one S-NSSAI. This identifier and a unique location ID (Cell, 5G NR, etc.) could, in one or more embodiments, be used as a blockchain entry for things like SLAs and many other use cases.

Reliance upon previous entries and independent validation are just two blockchain features that can be utilized to improve one or more embodiments. One having skill in the relevant art(s), given the description herein, will appreciate that other blockchain features not described herein, as well as features developed in the future, can be utilized by one or more embodiments without departing from the spirit of the disclosure described herein, e.g., additional blockchain functions can further facilitate storage of, and access to, slice usage data.

To provide additional details for the combinations of features described above, FIGS. 4 and 5 provide messaging and activity diagram describing the allocation of network slices to multiple devices, and modifying the network slices based on changing contexts, and slice usage and the expulsion of an application from use of an allocated network slice.

Figure 4:
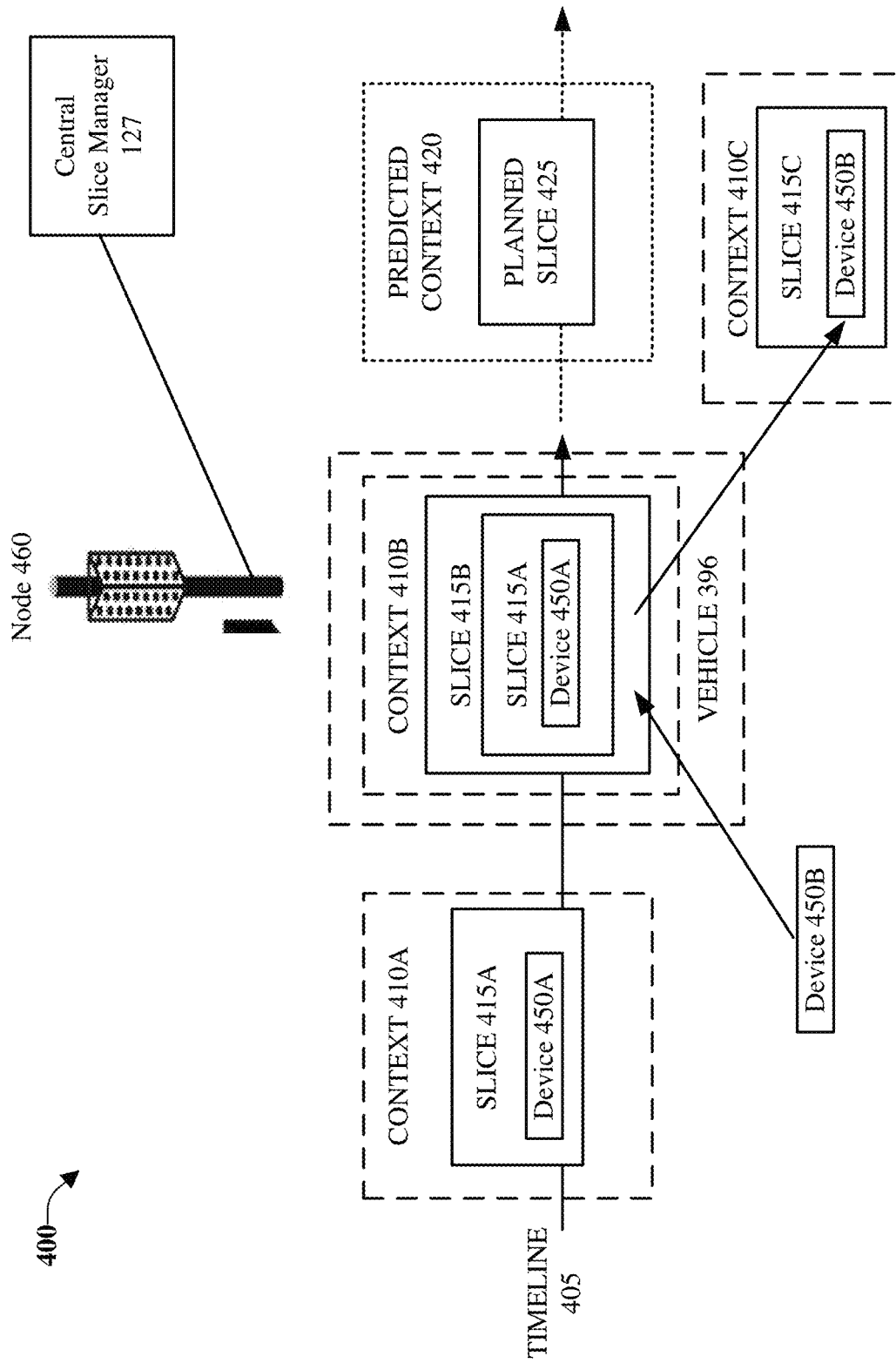
FIG. 4 depicts a diagram that illustrates an example system that can facilitate the management of devices with resources of nested slices, across multiple contexts, in accordance with one or more embodiments.

FIG. 4 depicts a diagram that illustrates an example system 400 that can facilitate the management of devices with resources of nested slices, across multiple contexts, in accordance with one or more embodiments. For purposes of brevity, description of like elements and/or processes employed in other embodiments is omitted. As depicted, system 400 can include node 460 coupled to central slice manager 128, vehicle 396 and devices 450A-B. Timeline 405 illustrates various allocations of resources devices 450A-B and vehicle 396 over time and in various contexts 410A-C. Timeline 405 further illustrates predicted context 420 with planned slice 425.

Device 450A can be initially allocated slice 415A based on factors including context 410A. In an example depicted in FIG. 4, device 450A can be allocated slice 415A based on factors discussed below. In this example, as described with FIG. 3 above, one or more embodiments can start building the slice 415A configuration based on slice templates 378, then, the slice can be personalized, both upon initial allocation of slice 415A and over the use of slice 415A. A discussed with examples below, one or more embodiments can have a playbook of slices templates that can be selected for slice allocations, based on factors that can include, but are not limited to, current geographic location, similar app demands, and deep SLA descriptions from applied SLA, e.g., throughput, accessed ports, etc.

Allocating network slices 415A-C based on different factors, including but not limited to performance of previous allocations to device 450A. Different factors that can be included in contexts 410A-C, and how slices 415A-C are managed based on contexts 410A-C, are discussed further below. Further discussed below, different factors can cause one or more embodiments to select slices for allocation based on slice templates 378. It should be noted that one or more embodiments can use a medium to long term perspective when allocating resources to slice 415A, e.g., because in one or more embodiments, slices can in some circumstances persist across sessions. One approach to detailed customization of slice 415A can use records of slice history 377 of the performance of slices utilized by device 450A. An additional or alternate approach can utilize historical records of the performance of various different slice configurations for context 410A. Because one or more embodiments can facilitate more control for providers in management of slice handoff (device to device, base station to base station) and utilization, as well as application and usage knowledge available for reference at the network (e.g., slice history 377 and slice templates 378), the embodiments can plan and utilize new resources.

One approach to achieving these functions is to utilize a nested, "slice-within-a-slice" architecture, e.g., using slices with subslices, such as subslice 415A of slice 415B in context 410B. In one or more embodiments of this nested approach, subslices such as slice 415A can be managed as a group, and consistent settings can be applied across subslices. For example, when context 410B is a vehicle 396 (e.g., a bus) and wireless LAN 394 connection can be provided to devices in vehicle 396, slice allocation characteristics can be applied to devices for different purposes, e.g., so as to maintain connectivity guarantees to particular users.

In one or more embodiments, when device 450A in slice 415A enters context 410B, an evaluation of the current configuration of slice 415A can be performed, and an assessment of whether an alternate SLA definition is required. In this example, slice 415A can have different characteristics based on device 450A (e.g., requirements of the device) and also based on a user of device 450A, e.g., a child connected to watch movies, a commuter who has a priority data plan, and a first responder at an accident scene, all can have allocated slices that reflect the uses for which the slice is being used. As discussed further with FIG. 5 below, rather than setting up a new slice when new contexts are encountered, one or more embodiments can persist slices, with some having modifications based on one or more hierarchically superior slices.

One approach to facilitating persistent slices is to enable slices to be combined or nested, in accordance with one or more embodiments. One or more embodiments can utilize user management (recursive or "slice-in-slice") and cross-access point transport of 5G network slices or slices-to-go (STG). In an example implementation, a slice can have allocated characteristics for one set of contexts (e.g., home and local area), then when traveling to other contexts, renegotiation of slice connection terms and characteristics is not required.

Once allocated, one or more embodiments can facilitate the modification of slice 415A both by central network resources, and by local networks that provide connectivity to the network using local protocols. In the example depicted in FIG. 4, context 410B is a local network (e.g., in a residence) that can provide connectivity to the provider network using local protocols, e.g., Wi-Fi and other similar short-range protocols. In this example, the residential local network of context 410B can connect to node 460 of the provider network so as to serve this connection to proximate devices, e.g., 450A-B. Thus, an "on a bus" template can be a template applied to classes of devices (MAC addresses, model, behaviors, etc.), so that as a device changes contexts, the template can be consistently applied to the device.

Moving along timeline 405, as device 450A transitions to context 410B, instead of being replaced by a new slice 415B with different settings adapted to context 410B, slice 415A can be converted into a subslice 415A of slice 415B. As discussed further below, subslices can be generated in a hierarchy of slices 415A-B, each potentially having independent characteristics and characteristics defined by a relationship between a slice 415B, and one or more subslices 415A.

One or more embodiments can facilitate local management of slices by local networks, e.g., allow user local networks to customize slices by type (e.g., all mobile devices), those in proximity (e.g., all wireless devices on a bus), or devices with a particular usage pattern (e.g. those watching video). In additional embodiments, instead of analyzing subslice 415A to apply configuration settings, a slice that has been previously incorporated can be identified (e.g., using a MAC address of associated device 450A), and prior settings can used as a personalized template, e.g., applied to a rediscovered device.

In one or more embodiments, at context 410B of timeline 405, components of slice management resources (e.g., central slice manager 128 and local slice manager 328) can evaluate connected devices 450A-B, slices allocated to the devices, slice history 377 of similar contexts, and other factors. This evaluation is represented in FIG. 3 as predicted context 420, this context having predictions of different factors that could go in to slice modifications for existing subslices (e.g., device 450B) as well as new slices for new devices joining wireless LAN 394. For example, based on the time of day, and day of week, a number of additional devices could be predicted (e.g., from slice history 377), and templates can be selected these predicted devices. In addition to selected templates, one or more embodiments can select specific personalization modifications to apply to specific slices, e.g., planned slice 425. In additional embodiments, the factors predicted can be used to pre-select SLAs from SLA manager 175. As would be appreciated by one having skill the relevant art(s), given the description herein, as discussed further with FIG. 6 below, AI/ML components 373 can also be employed to predict characteristics of predicted context 420 and select characteristics of planned slice 425.

Figure 5:
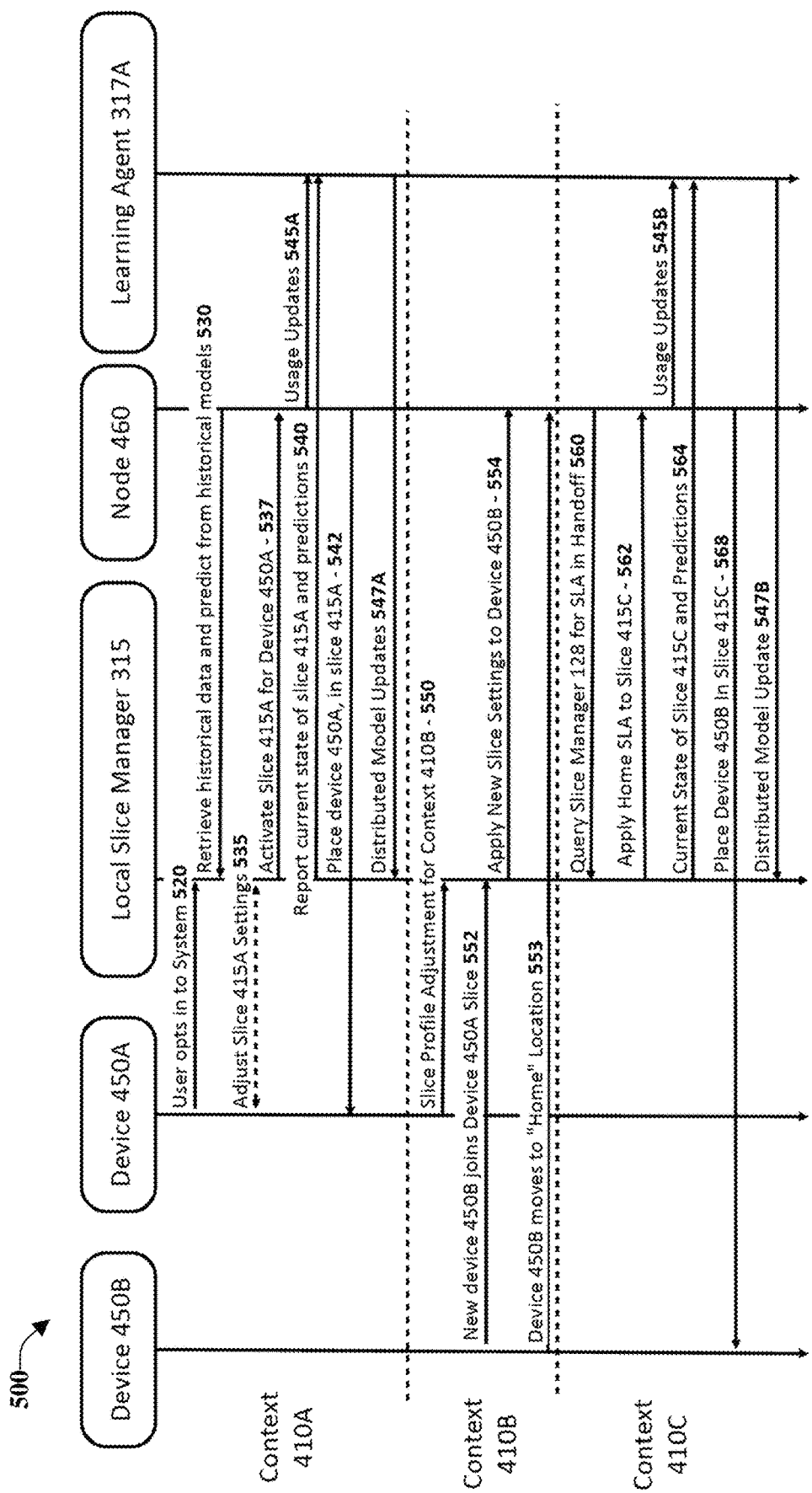
FIG. 5 depicts a non-limiting, example flow diagram that illustrates a system with connections and examples of data exchanged between UE devices and local slice manager, in accordance with one or more embodiments described herein.

FIG. 5 depicts a non-limiting, example flow diagram that illustrates system 500 with connections and examples of data exchanged between UE devices 450A-B and local slice manager 315, in accordance with one or more embodiments described herein. Repetitive description of like elements and/or processes employed in respective embodiments is omitted for sake of brevity. System 500 is illustrated by tracking data flows in embodiments among device 450A-B, local slice manager 315, node 460, and learning agent 317A. To illustrate the evolution of components of the system over time and in different conditions, contexts 410A-C of FIG. 4 are shown in relation with data flows of the contexts. An example system 500 similar to system 400 is discussed below.

At 520, device 450A can opt into a persistent slices system that can facilitate the reuse and targeted modification of slices across different contexts 410A-C in accordance with one or more embodiments. At 530, local slice manager 315 can retrieve historical data 530 from node 460 regarding device 450A. In one or more embodiments, characteristics of device 450A (e.g., model, capabilities, currently executing applications, performance guarantees) can be combined with historical data 530, for operations such as identifying device 450A from previous times connecting. Device characteristics can also be used to select a template of settings that can be used to generate slices. In one or more embodiments, these templates can reduce the analysis required to generate slices.

Other uses of device 450A characteristics and historical data 530 include selection of slice characteristics based on performance for a particular usage, e.g., resources to maintain service to a guaranteed level during video stream display. In addition, as noted above, one or more embodiments can use historical data for device 450A (or similar devices) in different contexts, to select slice characteristics that can be applied across different contexts, e.g., for persistent slices. In addition, local slice manager 315, as the host of a local network of devices, can adjust slices to improve the performance of other devices in the network\.

In this example, slice 415A, to be applied to device 450A can be altered by local slice manager 315 based on different factors described herein, e.g., characteristics of device 450A, slice history 377, AI/ML analysis by distributed learning agents 317A-B, and network requirements of the local network, e.g., congestion, quality of service, etc. At 535 a slice created based on the template can have settings adjusted based on personalized factors, in accordance with one or more embodiments. As noted above, one or more embodiments can generate slice configurations that can be used across different contexts, and this slice persistence can be further improved by personalizing slice characteristics selected by template.

At 537, slice 415A can be activated by local slice manager 315, in accordance with one or more embodiments. In one or more embodiments, an activation can be provided by central slice manager 128 to local slice manager 315, e.g., to provide a centralized approval of different slice configurations and user capabilities. At 540, the current state of slice 415A can be reported to node 460 by local slice manager 315, in accordance with one or more embodiments. In one or more embodiments, local slice manger can report slice activities to node 460, e.g., to keep slice history 377 up to date.

At 545A the information received in the current state report of 540 can be used to update learning agent 317A at network device 150. As noted above, learning agent 317A, in one or more embodiments, includes the use of AI/ML components, such as AI/ML components 373 (e.g., learning agent 317A) and similar AI/ML components local to vehicle onboard UE 310, e.g., learning agent 317B. AI/ML details are discussed with FIG. 6.

At 542, local slice manager 315 can allocate slice 415A to device 450A, in accordance with one or more embodiments. In one or more embodiments, slices such as slice 415A can allocated to one or more UEs and other devices, e.g., IoT devices discussed with FIG. 7 below. Further, as noted above, slices can be allocated to local user network equipment (e.g., vehicle onboard UE 310) to provide resources that can be further shared within the network, e.g., subslices such as slice 415A of slice 415B.

At 547A, local slice manager 315 can receive distributed model updates via node 460, from learning agent 317A of network device 370, in accordance with one or more embodiments. As described below with FIG. 6, learning agent 317A, as a part of a distributed system of learning agents (e.g., learning agent 317A-B) can apply AI/ML approaches to analyzing the performance of allocated slices so as to improve the configuration of slices within the system. One was this can occur, is by learning agent 317A periodically providing model updates to local slice manager 328, learning agent 317B, and other type of components where slice configurations are generated.

At 550, device 450A moves from context 410A to 410B, and requests slice profile adjustment for context 410B, in accordance with one or more embodiments. As depicted, device 450A, already having an allocated slice 415A can request to have a new slice allocation based on changed context 410A to 410B, and a slice can be generated based on processes described above, e.g., device 450A characteristics can be analyzed, slice history 377 can be queried, a slice template of slice templates 378 can be selected. In an alternative embodiment, device 450A, as a part of a system of persistent slices, can, instead of receiving a new slice allocation, have slice 415A modified by local slice manager 328, to be better adapted to context 410B. In another alternative embodiment, before modifying slice 415A, local slice manager 328 can incorporate slice 415A into slice 415B as a subslice.

At 552, new device 450B joins device 450A in slice 415A, nested in slice 415B, in accordance with one or more embodiments. As noted above, one approach that can be used by local slice managers 328 to administer multiple devices, is to incorporate multiple devices in a single slice. In this example, device 450B is added to slice 415A, a subslice of slices 415B, a slice for the local network device, e.g., vehicle onboard UE 310. At 554, new slice settings, e.g., those of slice 415A, can be applied by local slice manager to device 450B, in accordance with one or more embodiments.

At 553, device 450B leaves context 410B to be in context 410C, in accordance with one or more embodiments. At 560, in this example, because slice 415C is newly generated for device 450B, an SLA can be received from SLA manager 175 via central slice manager 128, in accordance with one or more embodiments. As with other aspects of slice configuration discussed herein, SLA manager can use slice history 377 and other SLA resources to generate the SLA for slice 415C. At 562, the received SLA can be applied to slice 415C, in accordance with one or more embodiments. At 564, the current state of slice 415C and predictions can be relayed from local slice manager 315, in accordance with one or more embodiments. At 545B the information received in the current state report of 564 can be used to update learning agent 317A at network device 150, in accordance with one or more embodiments. As discussed with FIG. 6 below, some embodiments of AI/ML components 373 can use consistently updated data to train and adapt the AI/ML components to handle different issues more accurately. In accordance with this approach, state, usage, and other data are consistently gathered and incorporated into different AI/ML components 373.

At 568, device 450B can be placed in slice 415C, in accordance with one or more embodiments. At 547B, after the activity, context changes, slice configuration changes, local slice manager 315 can receive distributed model updates via node 460, from learning agent 317A of network device 370, in accordance with one or more embodiments.

In an example that illustrates the dedication of resources of a slice for safety-critical or other prioritized events, example vehicle 396 can be an ambulance. To provide useful functions for this example, one or more embodiments can take advantage of the proximity of ambulance vehicle onboard UE 310. For example, by combining different technologies that can detect aspects of users and devices in the ambulance, with local slice manager 328 and learning agent 317B, some embodiments can configure different slice resource allocations.

In an example implementation of this approach, when a person with a personal UE 320A enters a specific area (e.g., inside the ambulance) different triggers can cause the allocation of a slice to personal UE 320A. For example, when a user with a smart watch, vehicle onboard UE 310 can establish a connection to the watch device (e.g., WiFi, Bluetooth, or other direct UE to UE communication) and allocate a priority slice both the watch an associated personal UE 320A, e.g., to collect health data from the devices for use by local medical equipment. An advantage of using direct UE to UE communication is that it can keep sensitive information off of the LAN of the ambulance.

In another example, an information providing medical information bracelet (e.g., RFID enabled) can be accessed and information can be used to allocate slices to devices associated with the patient, and medical devices required for the patient's bracelet stored medical conditions. In another application of using proximity detection with slice allocation, when the patient with the allocated slice reaches a destination (e.g., a hospital), one or more embodiments can transfer provision of the slice resources to a local slice manager on the hospital.

Figure 6:
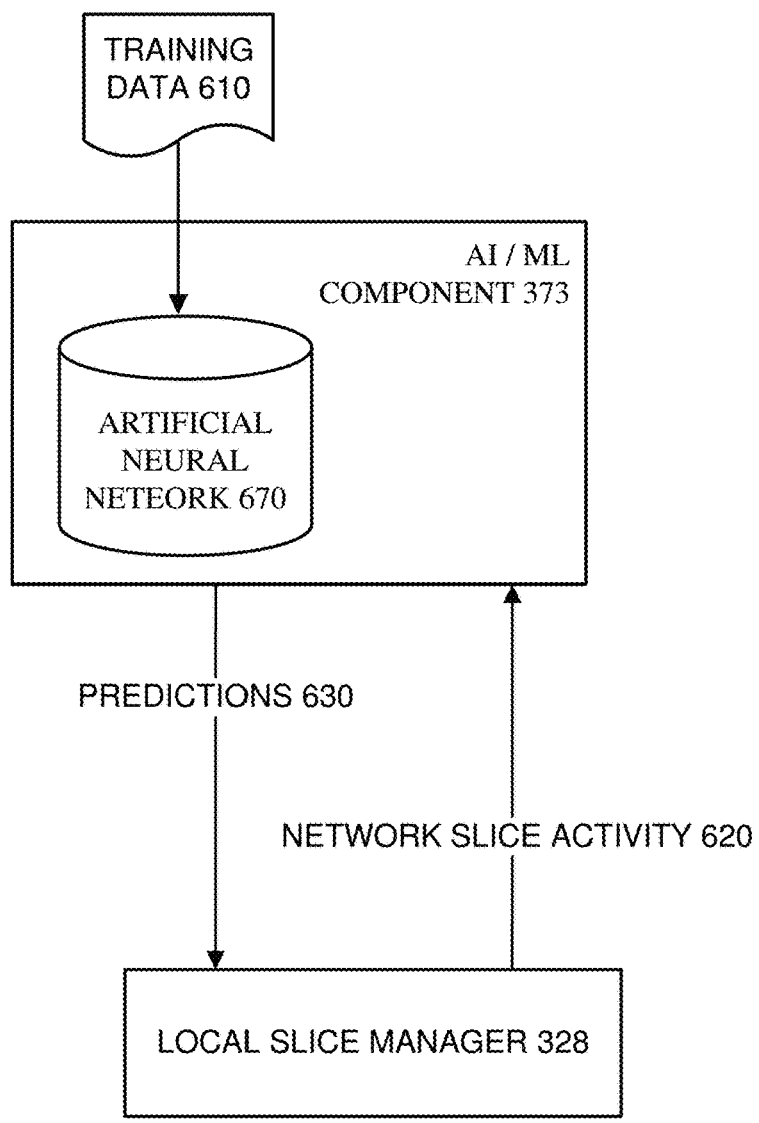
FIG. 6 illustrates an implementation of an example, non-limiting system that can facilitate management of network slices by employing artificial intelligence/machine learning (AI/ML) components, in accordance with one or more embodiments described herein.

FIG. 6 illustrates an implementation of an example, non-limiting system 600 that can facilitate management of network slices by employing AI/ML components 373, in accordance with one or more embodiments described herein. Repetitive description of like elements and/or processes employed in respective embodiments is omitted for sake of brevity.

As depicted, system 600 can comprise AI/ML components 373 coupled to local slice manager 328. AI/ML component 373 can comprise artificial neural network (ANN) 670 trained by training data, e.g., slice history 377 and other system characteristics.

In certain embodiments, different functions of AI/ML can be facilitated based on classifications, correlations, inferences and/or expressions associated with principles of artificial intelligence. For example, AI/ML component 373 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, including deep neural networks (DNN), reinforcement learning (RL), Bayesian Statistics, long short-term memory (LSTM) networks.

In another example, in one or more embodiments, AI/ML models can be incorporated for use by distributed learning agents 317A-B to analyze one or more of all of the inputs discussed above, e.g., device 450A-B characteristics, slice history 377, available slice templates 378, records of blockchain ledgers 376A-B, performance capacity of vehicle onboard UE 310, and other data sources. Example AI/ML component 373 inputs, outputs, an adaption approaches are discussed below.

Example inputs for AI/ML components 373 can include historical network node 460 performance, e.g., across AP types like WiFi, 5G, etc.), e.g., historical data such as slice history 377. Other input can include historical UE requirements, e.g., while within a location, time of day, application used. In additional embodiments, templates used to start the allocation of slices can also be used by AI/ML components to make predictions. Other inputs can include a current state of node (UEs/utilization).

Example outputs of AI/ML components can include selections of a slice template data to be used for planned slice 425, prediction of where and when a slice will transition to a new contexts. Example learning processes that can be facilitated by one or more embodiments include adapting to a current state of personal UE 450A, current location, time, and applications used. In one or more embodiments, upon detection of actions performed by personal UE that are abnormal, alerts can be generated along with suggested initial adaptions to address the alerts. Additional alerts can include but are not limited to, a time and configuration for handoff to different AP type, at crossing boundary, etc.

In another aspect, AI/ML component 373 can perform a set of machine learning computations associated with the selection of different slice characteristic. One having skill in the relevant art(s), given the description herein will appreciate that, for example, AI/ML component 373 can operate to perform analysis that can include, but is not limited to: RL analysis, a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and a set of different machine learning computations to analyze network data, and detect anomalous activities in allocated network slices.

In an example AI/ML approach that can be utilized by one or more embodiments, ANN 670 can be optimized (also termed "trained" herein) by submitting optimizing data to the network, e.g., It should be noted that this description of employing an ANN is non-limiting, e.g., one or more embodiments can use other types of machine learning algorithms that receive input and perform analysis, e.g., slice history 377, as described above.

In one or more embodiments, to facilitate the use of ANN 670 for anomaly detection, training data 610 can be created by combining operational data with confirmed conclusions about the operational data. For example, an immediate shift from low-bandwidth requirements to high-bandwidth indicates video is being streamed to a UE (e.g., as in the first responder example described above), and when an application utilizing ultra-low latency transitions to large data downloads, this indicates a system update is being performed on a system that requires low latency in other contexts (e.g., as in the UAV example described above). As would be appreciated by one having skill in the relevant art(s), given the description herein, training data 610 can be used to train the artificial neurons of ANN 670 such that, over time, ANN 670 can accurately analyze network slice activity 620 (e.g., from central slice manager 128) and produce data corresponding to predictions 630.

An example implementation of AI/ML components can employ a Bayes Network or Markov network that can model elements including, but not limited to, network elements and a distributed network of models. A network dependency graph could be built that models the network and physical and virtual or separate and the dependencies between graph nodes.

In a variation of the above approach, in other embodiments, failure probabilities can be generated by one or more embodiments for each node, and can be store for reference. Based on this, during prediction by AI/ML components 373, alarms and network status information can be combined to infer root causes of delays or failures of the network. Routing or other network configurations can then be made to maintain SLA performance.

Figure 7:
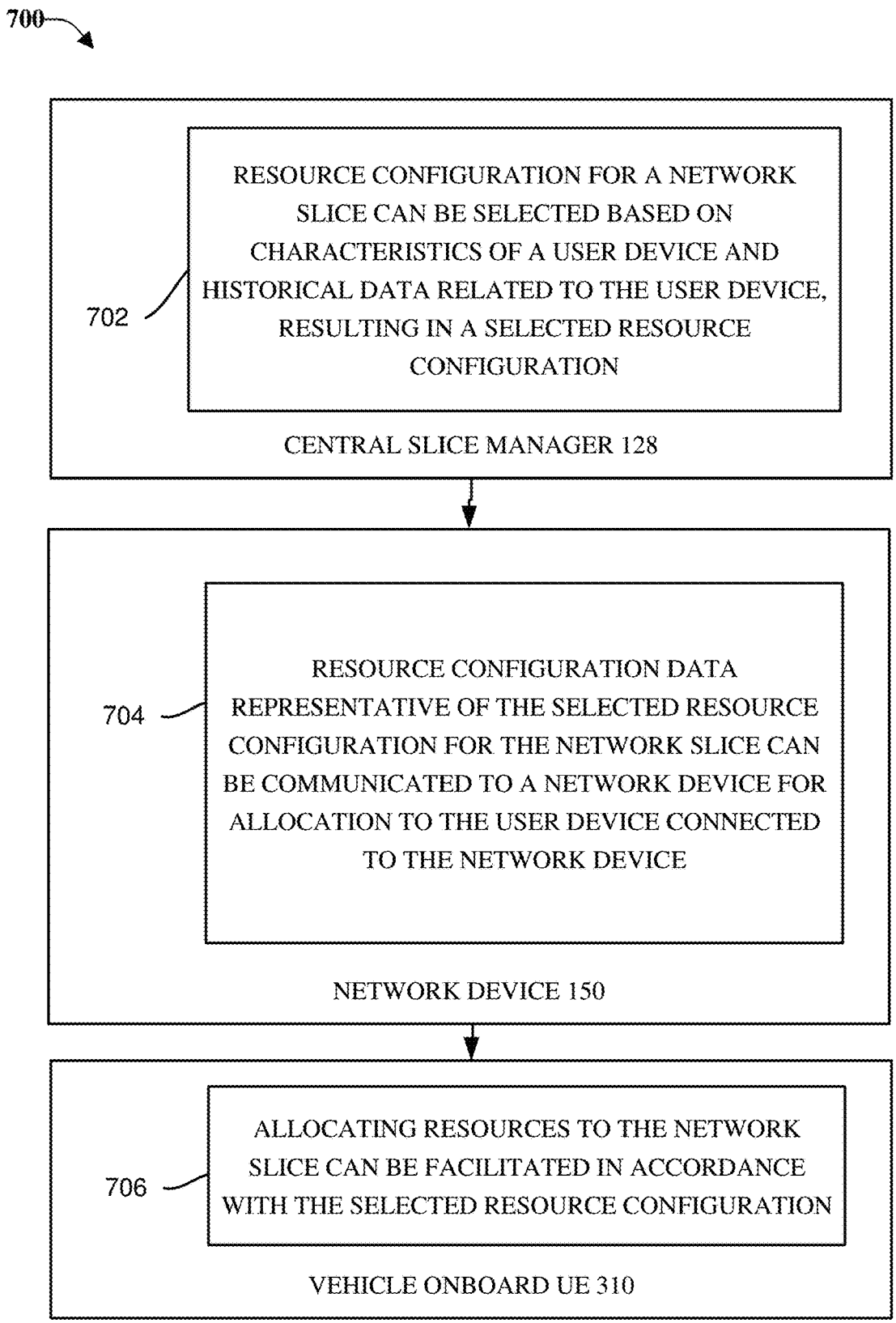
FIG. 7 illustrates an implementation of an example, non-limiting system that can facilitate the allocation, scheduling, and management of network slice resources, in accordance with one or more embodiments described herein.

FIG. 7 illustrates an implementation of an example, non-limiting system 700 that can facilitate the allocation, scheduling, and management of network slice resources, in accordance with one or more embodiments described herein. Repetitive description of like elements and/or processes employed in respective embodiments is omitted for sake of brevity.

At 702, in system 700, resource configuration for a network slice can be selected based on characteristics of a user device and historical data related to the user device, resulting in a selected resource configuration. For example, in an example implementation of system 700, resource configuration for a network slice can be selected central slice manager 128 based on characteristics of a personal UE 320A and slice history 377 related to the user device, resulting in a selected resource configuration.

At 704, in system 700, resource configuration data representative of the selected resource configuration for the network slice can be communicated to a network device for allocation to the user device connected to the network device. For example, in an example implementation of system 700, resource configuration data representative of the selected resource configuration for the network slice can be communicated by network device 150 to local slice manger 328, for allocation to the user device connected to the network device At 706, in system 700, allocating resources to the network slice can be facilitated in accordance with the selected resource configuration. For example, in an example implementation of system 700, vehicle onboard UE 310 can facilitate allocating resources to the network slice in accordance with the selected resource configuration.

Figure 8:
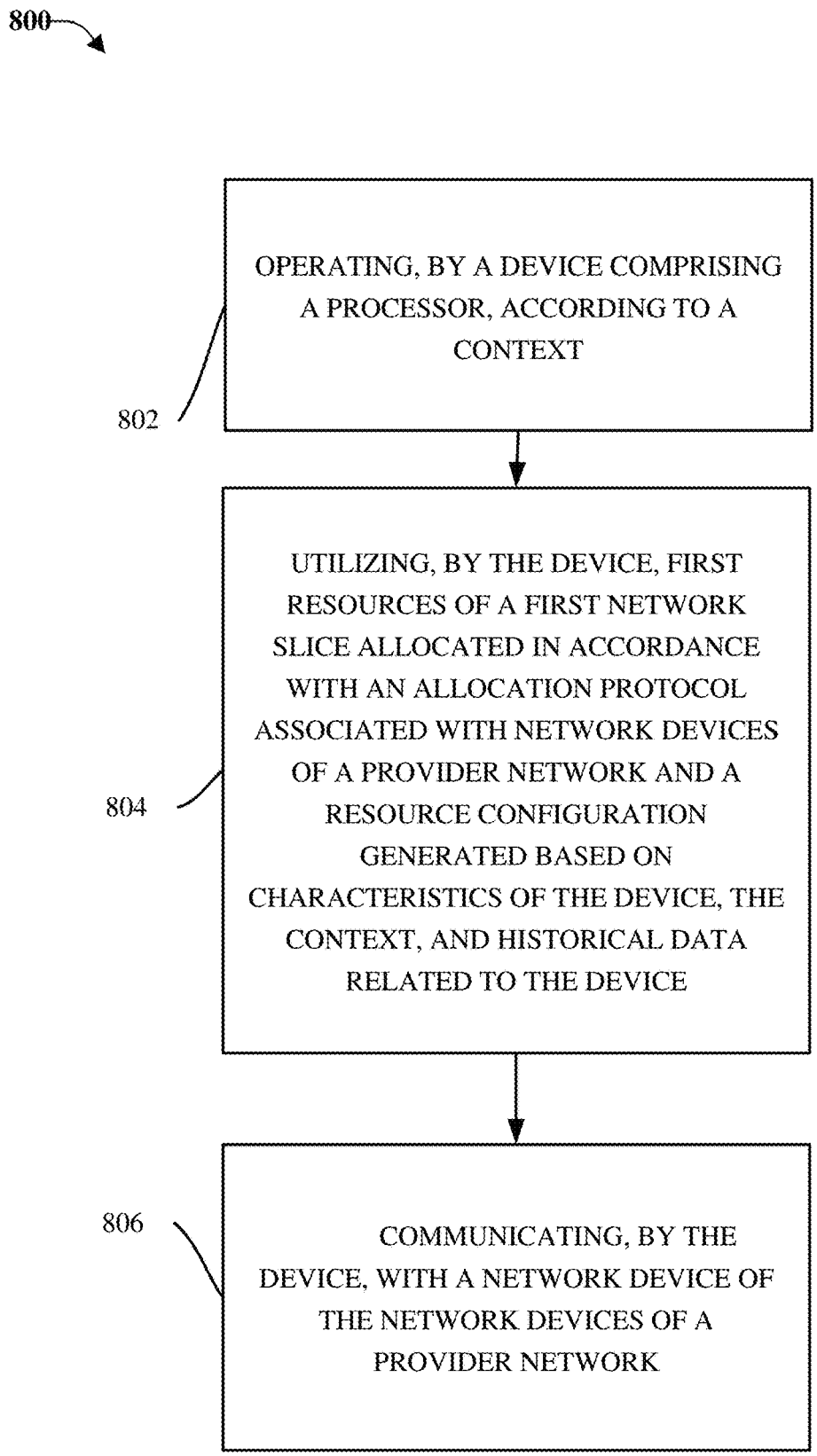
FIG. 8 illustrates a flow diagram of an example method that can facilitate the allocation, scheduling, and management of network slice resources, in accordance with one or more embodiments.

FIG. 8 illustrates a flow diagram of an example method 800 that can facilitate the allocation, scheduling, and management of network slice resources, in accordance with one or more embodiments. For purposes of brevity, description of like elements and/or processes employed in other embodiments is omitted.

At 802, method 800 can comprise, operating, by a device comprising a processor, according to a context. For example, in some embodiments, method 800 comprises operating, by mobile handset 900 that comprises processor 902, according to context 410A.

At 804, method 800 can comprise, utilizing, by the device, first resources of a first network slice allocated in accordance with an allocation protocol associated with network devices of a provider network and a resource configuration generated based on characteristics of the device, the context, and historical data related to the device. For example, in some embodiments, method 800 comprises utilizing, by device 450A, first resources of a first network slice 415A allocated by local slice manager 328 in accordance with an allocation protocol associated with network device 370 of a provider network 390 and a resource configuration generated based on characteristics of the device 450A, context 410A, and slice history 377 data related to device 450A.

At 806, method 800 can comprise, communicating, by the device, with a network device of the network devices of a provider network. For example, in some embodiments, method 800 comprises communicating, by device 450A, with network device 370 of the network devices of a provider network 390.

Figure 9:
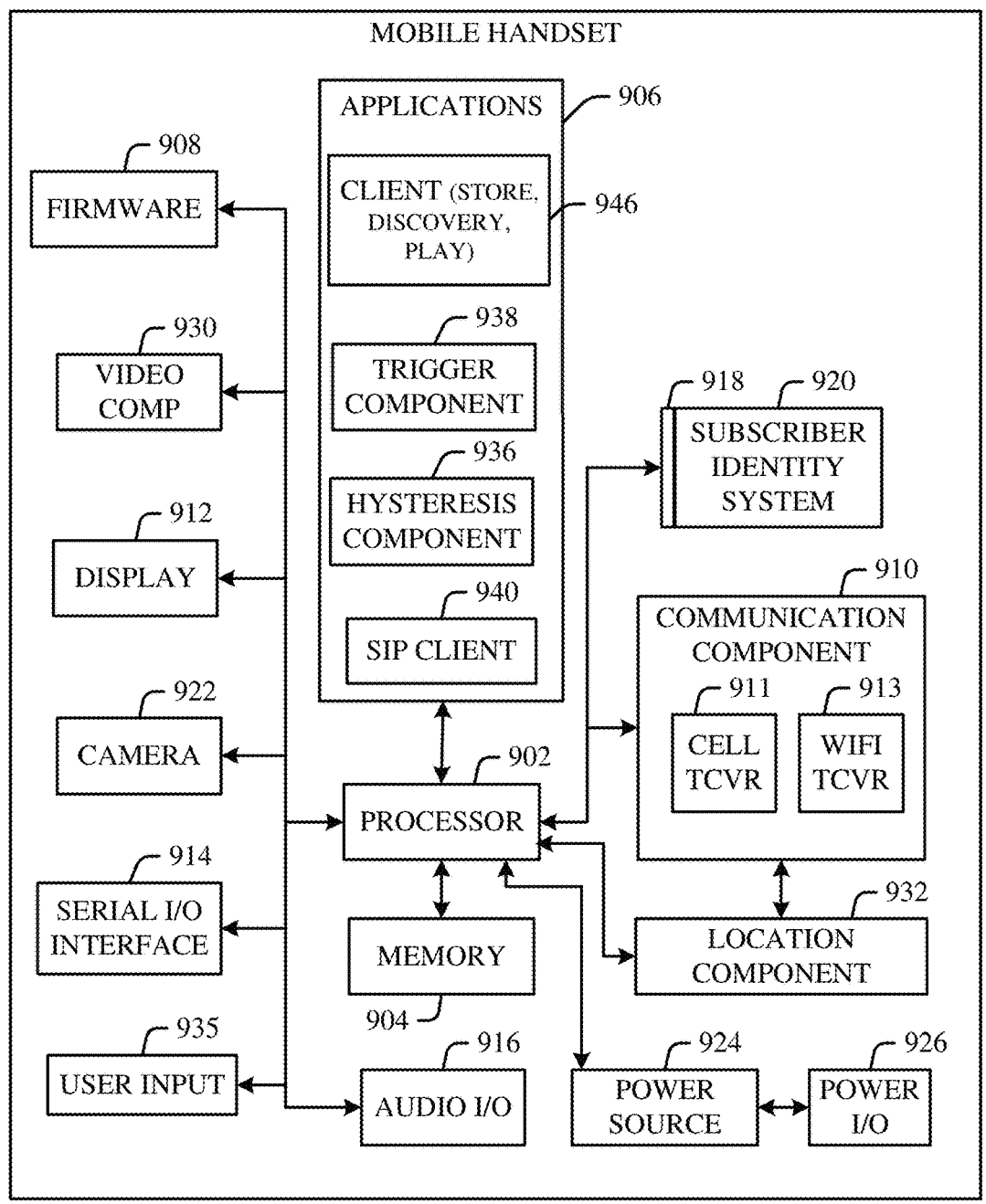
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As discussed with FIG. 1, network 190 can include a wireless communication system, and thus can include one or more communication service provider networks that facilitate providing wireless communication services to various user equipments included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 150 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

Network 190 can employ various cellular systems, technologies, and modulation schemes to facilitate wireless radio communications between devices (e.g., UEs 140A-B and network device 150). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
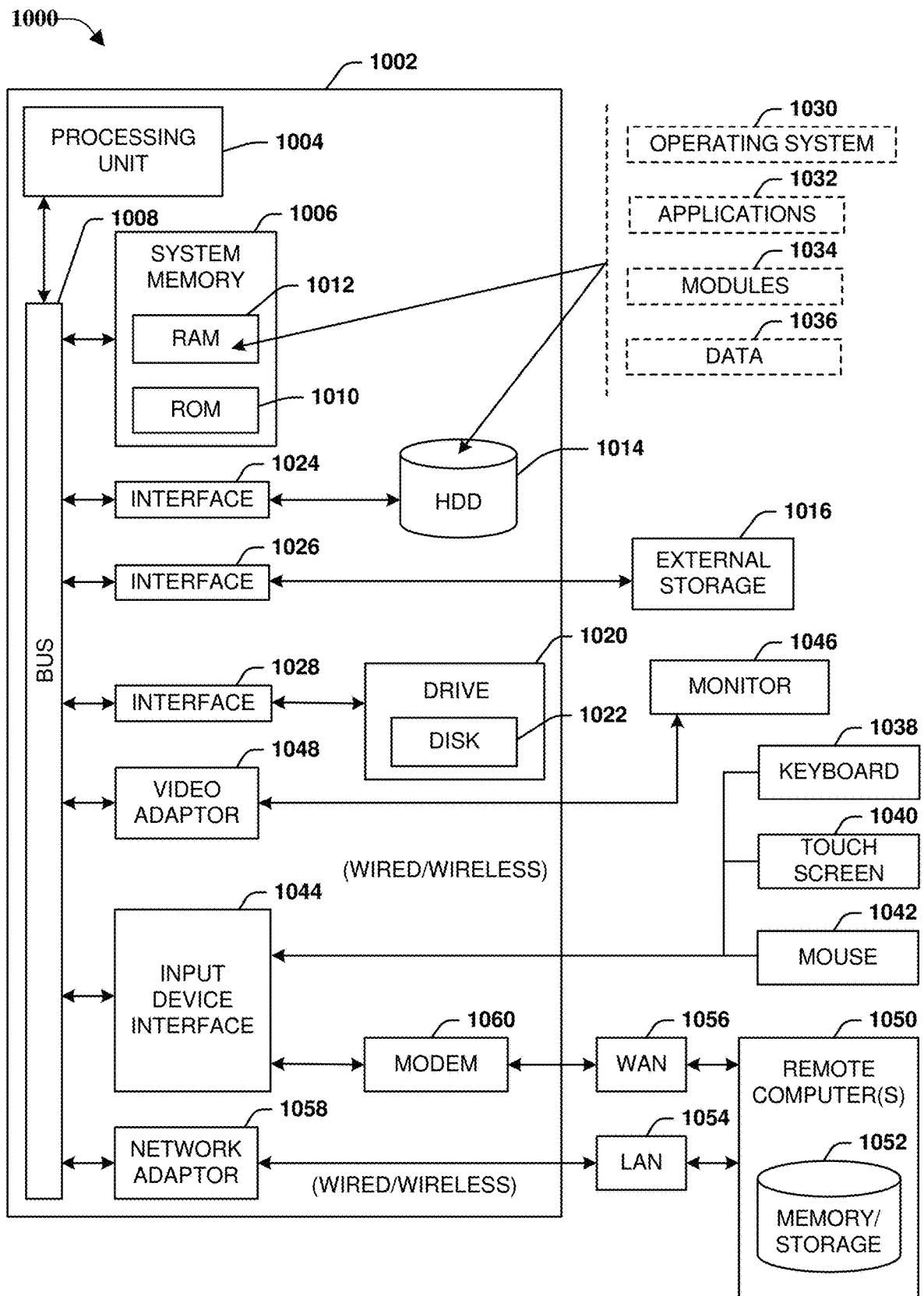
FIG. 10 illustrates an example block diagram of an example computer operable to engage in a system architecture that can facilitate processes described herein, in accordance with one or more embodiments.

In order to provide additional context for various embodiments described herein, FIG. 10 and the following discussion are intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Network equipment, comprising:
   a processor; and
   a memory that stores executable instructions that, when executed by the processor, facilitate the performance of operations, comprising:
   based on characteristics of a user device, and historical data related to the user device, selecting a resource configuration for a network slice, resulting in a selected resource configuration, wherein the historical data is comprised in an information block of a blockchain ledger stored at blockchain node equipment, wherein the historical data is stored by appending the information block to the blockchain ledger, and wherein the appending of the information block comprises communicating a request to the blockchain node equipment to generate the information block based on previous blocks in the blockchain ledger that were generated prior to the information block.

2. The network equipment of claim 1, wherein the historical data related to the user device comprises data of a network node associated with the user device.

3. The network equipment of claim 1, wherein the historical data related to the user device comprises historical requests of the user device.

4. The network equipment of claim 1, wherein the historical data related to the user device comprises a template of resource configuration generated based on usage by user devices, comprising the user device.

5. The network equipment of claim 1, wherein the selecting of the resource configuration for the network slice is further based on at least one of a prediction of a future state of the user device, or information corresponding to a current state of the user device.

6. The network equipment of claim 1, wherein the blockchain ledger comprises a persistent, tamper resistant data structure.

7. The network equipment of claim 1, wherein the operations further comprise storing the selected resource configuration in the blockchain ledger.

8. A method, comprising:
operating, by a device comprising a processor, according to a context;
utilizing, by the device, first resources of a first network slice allocated in accordance with an allocation protocol associated with network equipment of a provider network and a resource configuration generated based on characteristics of the device, the context, a service level agreement associated with the device, and historical data related to the device, wherein the historical data is comprised in an information block of a blockchain ledger stored at blockchain node equipment, wherein the historical data is stored by appending the information block to the blockchain ledger, and wherein the appending of the information block comprises communicating a request to the blockchain node equipment to generate the information block based on other blocks in the blockchain ledger that were generated before the information block.

9. The method of claim 8, wherein the blockchain data structure comprises a persistent, tamper resistant data structure.

10. The method of claim 8, wherein the blockchain data structure comprises a blockchain ledger stored on blockchain node equipment.

11. The method of claim 8, wherein the first network slice was allocated based on a machine learning process configured based on the characteristics of the device and the historical data related to the device.

12. The method of claim 11, wherein the machine learning process employs a neural network trained based on the characteristics of the device and the historical data related to the device.

13. The method of claim 12, wherein the neural network comprises a long short-term memory neural network.

14. The method of claim 8, further comprising, utilizing, by the device, second resources of a second network slice, wherein the second resources of the second network slice incorporate the first resources of the first network slice.

15. A non-transitory machine-readable medium, comprising executable instructions that, when executed by a processor of a device, facilitate performance of operations, comprising:
obtaining first information corresponding to characteristics of a user equipment, and historical data of the user equipment;
based on the first information, configuring a network slice of resources of network devices of a provider network, wherein the historical data is comprised in an information block of a blockchain ledger stored at blockchain node equipment, wherein the historical data is stored by appending the information block to the blockchain ledger, and wherein the appending of the information block comprises communicating a request to the blockchain node equipment to generate the information block based on previously generated blocks in the blockchain ledger.

16. The non-transitory machine-readable medium of claim 15, wherein the operations further comprise:
predicting a future context of the user equipment based on the first information and current state information for the user equipment; and
generating a planned network slice of the resources of the network devices of the provider network based on the future context of the user equipment.

17. The non-transitory machine-readable medium of claim 15, wherein the configuring the network slice of resources is further based on a defined template selected for the user equipment and the context.

18. The non-transitory machine-readable medium of claim 17, wherein the operations further comprise updating the defined template based on current state information for the user equipment.

19. The non-transitory machine-readable medium of claim 15, wherein the operations further comprise providing the network slice of resources to the user equipment.

20. The non-transitory machine-readable medium of claim 15, wherein the operations further comprise storing configuration information corresponding to results of configuring the network slice of resources.

* * * * *